A. C. PLETZ.
CHANGE SPEED AND REVERSE DRIVE MECHANISM.
APPLICATION FILED SEPT. 18, 1908.
948,825.
Patented Feb. 8, 1910.
2 SHEETS—SHEET 2.
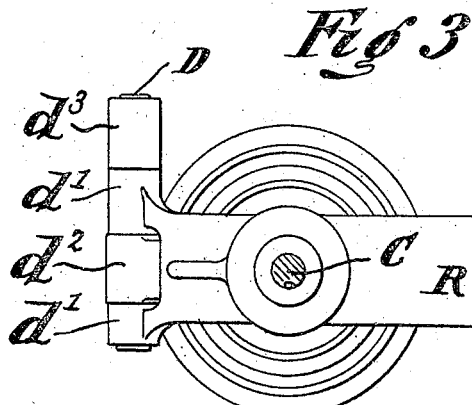
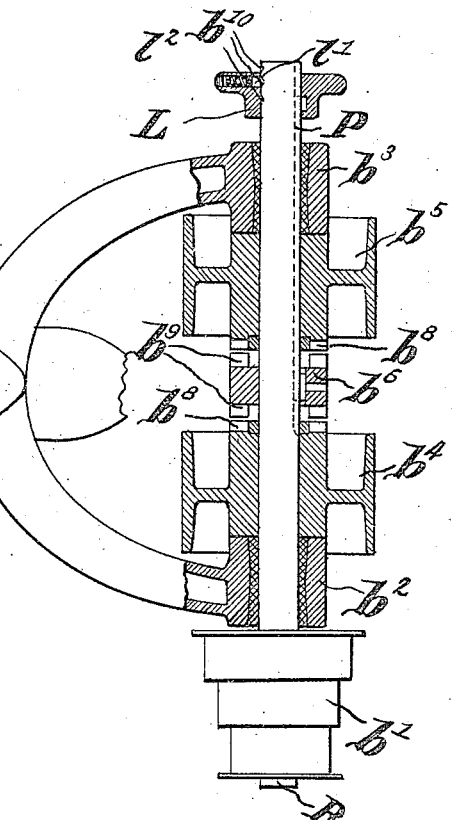
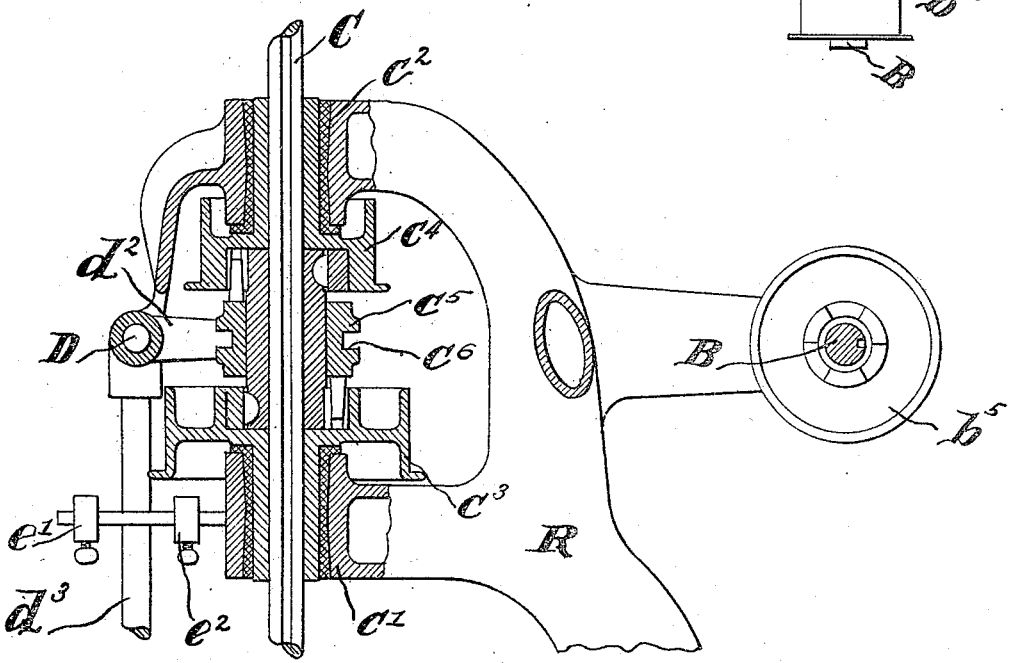

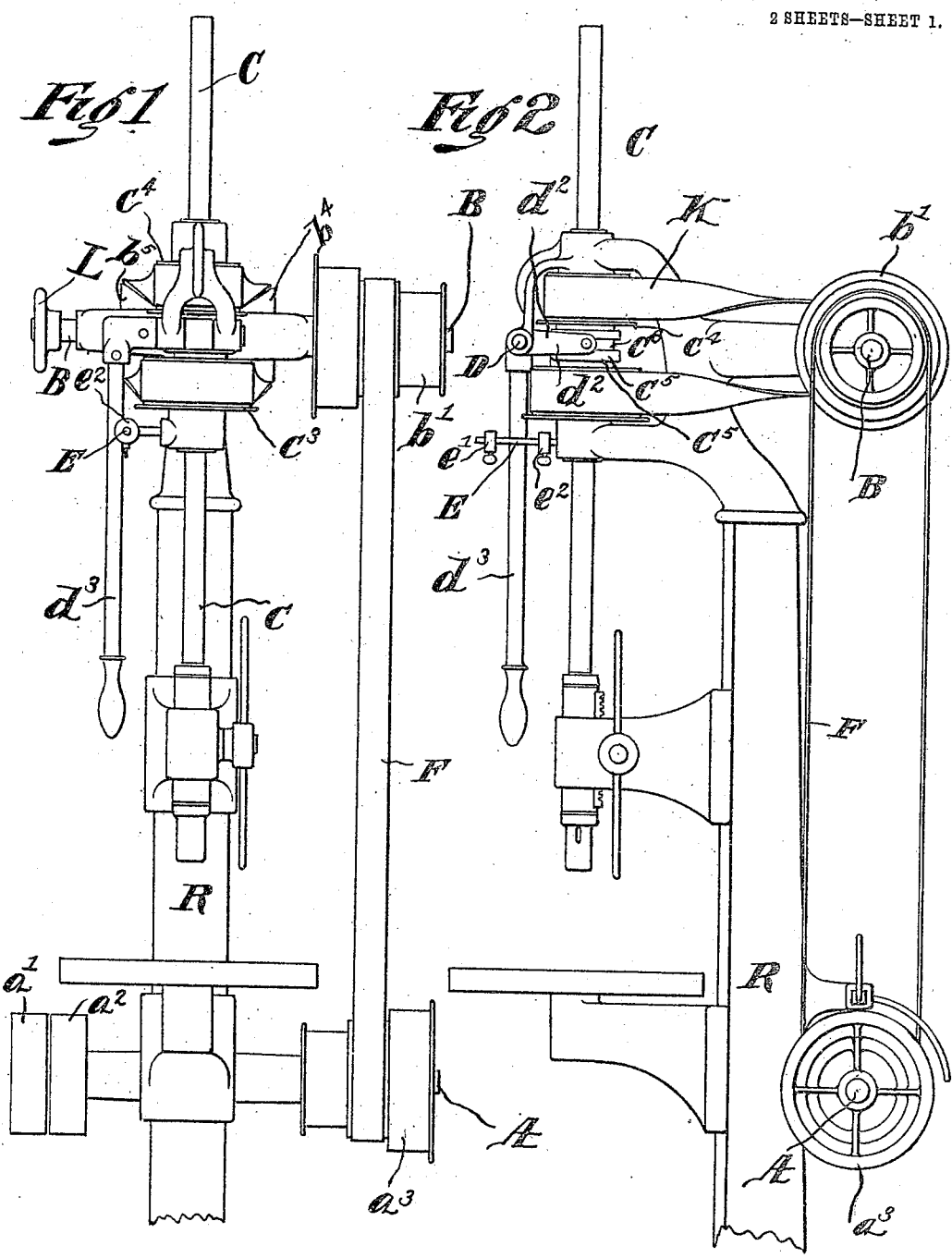

UNITED STATES PATENT OFFICE.

ARTHUR C. PLETZ, OF CINCINNATI, OHIO.

CHANGE-SPEED AND REVERSE-DRIVE MECHANISM.

948,825.

Specification of Letters Patent.

Patented Feb. 8, 1910.

Application filed September 18, 1908. Serial No. 453,630.

*To all whom it may concern:*

Be it known that I, ARTHUR C. PLETZ, a citizen of the United States, residing at Cincinnati, in the county of Hamilton and State of Ohio, have invented new and useful Improvements in Change-Speed and Reverse-Drive Mechanism, of which the following is a specification.

This invention relates to new and useful improvements in change speed and reverse drive mechanism, and is more particularly applicable to machine tools, such as drills.

The object of this invention is to provide a mechanism which will give two forward and two reverse speeds without shifting the belts on the cone pulleys. Furthermore to make this mechanism especially adaptable to metal drills, where it would be very advantageous in the operation of drills designed to do both drilling and tapping.

To this end my invention consists of a secondary shaft with a connection thereon to receive power, a plurality of connections normally loose on said shaft each adapted to be fixed to the shaft to transmit power to the principal shaft of the machine, and a plurality of connections normally loose on the principal shaft, each adapted to be fixed to the said shaft to transmit power thereto.

In the particular embodiment of my invention selected for illustration, Figure 1, is a front elevation of a metal drill embodying my invention. Fig. 2, is a side elevation of the same; Fig. 3, is a top plan view of the same, with parts broken away and omitted, and the secondary shaft housing and parts carried by said shaft, in section; and Fig. 4, is a side elevation of the same with parts broken away and parts in section.

Referring to the drawings, R, is the body of a metal drill, which has journaled in its lower portion shaft, A. Shaft, A, carries at one of its ends tight and loose pulleys, $a^1$, $a^2$, respectively. At the opposite end of shaft, A, is a cone pulley, $a^3$, rotatively attached to said shaft and connected by means of belt, F, to a similar pulley, $b^1$, rotatively attached to the shaft, B. Shaft, B, is journaled near the top of the body, R, of the drill in journals, $b^2$, $b^3$. Pulleys, $b^4$, $b^5$, are adjacent to journals, $b^2$, $b^3$, respectively and are normally loose on shaft, B. The inward face of the hubs of said pulleys have detention blocks, $b^8$, of a positive clutch, and these blocks are adapted to engage with the detention blocks of the clutch member, $b^6$. Clutch member, $b^6$, is fixed to a spline, P, fitted in the shaft, B, between the pulleys, $b^4$, $b^5$, and extending to one end of the shaft. The outer end of spline P, is fixed to a member L, shaped similarly to a hand wheel. A conical pointed rod, $l^1$, is inclosed in the member, L, and a spring, $l^2$, exerts force on it and tends to force its conical point firmly on the shaft, B. The conical point is adapted to engage with any one of the three notches, $b^{10}$, on shaft, B. A longitudinal movement of the member, L, is transmitted through spline, P, to clutch member, $b^6$, and said clutch member is moved accordingly. When the conical point of rod, $l^1$, is in the middle notch on shaft, B, the clutch member, $b^6$, is not engaged with either of the clutch members of the pulleys, $b^4$, $b^5$. However when the conical point is in either of the end notches the clutch member, $b^6$, is in engagement with one of the clutch members of the pulleys, $b^4$, $b^5$, depending on which notch the said point is in engagement.

Normally loose on drill spindle, C, are pulleys, $c^3$, and $c^4$. These pulleys on one of their sides have extended hubs, and on their other sides members of a friction clutch. The extended hubs are journaled in the bearings, $c^1$, $c^2$, and are pierced by the spindle, C.

A friction clutch member, $c^5$, is splined to the drill spindle, C, and is adapted to be thrown into contact with either of the clutch members of the pulleys, $c^3$, or $c^4$. Yoke, $b^2$, is rigidly attached to shaft, B, and connected to the clutch member, $c^5$, by means of a roller attaches to it and operating in an annular groove, $c^6$, of the said clutch member.

Shaft, D, is journaled in the bearings, $d^1$, $d^1$, and has connected to it a handle, $d^3$, by which it is operated. The oscillation of said handle is limited by stops, $e^1$, $e^2$, which are adjustable on rod, E, suitably fastened to the body, R, of the drill.

A hand feed and suitable table of the common type are provided for the drill as is obvious from the drawings.

A twisted continuous belt, K, travels from pulley, $b^4$, to pulley, $c^3$ and $c^4$, over these pulleys and thence to pulley, $b^5$. This type of connection causes pulley $c^3$, and $c^4$, to rotate in opposite directions relative to one another and pulleys, $b^4$, $b^5$, to rotate in opposite directions relative to one another.

Pulleys, $b^4$, $b^5$, are of the same diameter, while pulleys, $c^3$, $c^4$, are of different diameters; pulley, $c^3$, being the larger.

The operation of the device is as follows:—Assume the driving belt in contact with the pulley, $a^2$, the cone pulleys connected by a belt operating over suitable steps of the same, and the clutch member, $b^6$, and $c^5$, in the position shown in the drawings. Before power can be transmitted to the drill spindle an engagement first must be had by the clutch member, $b^6$ with either of the clutch members of the pulleys, $b^4$, or $b^5$; which engagement will cause one of the pulleys to be rotatively attached to shaft, B. Suppose the clutch member, $b^6$, is in engagement with the clutch member of the pulley, $b^4$, and the pulleys, $c^3$, and $c^4$, both rotating, and loose on the drill spindle, and friction clutch member, $c^5$, must be engaged with one of the friction clutch members of the pulley, $c^3$, or $c^4$, before the spindle will receive any power. It is obvious that a higher speed of the drill spindle could be had if the clutch member of the pulley $c^4$, was in engagement with the clutch member, $c^5$, than if the clutch member of the pulley, $c^3$ was in engagement with said clutch member, $c$; and that the direction of the rotation of the spindle would be in an opposite direction, when the clutch member of pulley, $c^3$, was in engagement to the direction of the rotation had when the clutch member of the pulley, $c^4$, was in engagement. Furthermore it will be evident that if either clutch members of the pulleys, $c^3$, and $c^4$, are in engagement with the clutch member, $c^5$, that a reverse rotation of the spindle at the same speed can be had without disturbing the engagement of the clutch members on the spindle, but by shifting the engagement of the clutch member, $b^6$, on shaft, B, to the opposite pulley's clutch member.

The clutch member, $c^5$, is thrown in and out of contact by means of the lever, $d^3$, which is attached to the same shaft as the yoke, $d^2$, connecting with the clutch member, $c^5$. As said lever's motion is limited by adjustable stops, $e^1$, and $e^2$, these stops may be so set that the clutch member, $c^5$, will only be adapted to engage with one of the clutch members of the pulleys, $c^3$, and $c^4$. Also by means of stops, $e^1$, and $e^2$, the force exerted to hold the friction clutch members in contact may be limited.

Clutch member, $b^6$, is thrown in and out of engagement by means of a long spline operating in a slot in shaft, D, and suitably attached to the clutch member, $b^6$, and the member, L, as afore described. The movement of the clutch member, $b^6$, is substantially limited by means of conical pointed rod, $l^1$, (adapted to seat in notches, $b^{10}$, on the shaft, B) and continually sustaining a force exerted by a spring tending to drive it toward the longitudinal axis of the said shaft. These notches are in accordance with three positions of the clutch member, $b^6$, viz: in engagement with clutch member of pulley, $b^4$, entirely out of engagement, and in engagement with clutch member of pulley $b^5$. A longitudinal movement, parallel to the length of the shaft of the member, L, makes the engagement and disengagement of the clutch member, $b^6$. The conical pointed rod, $l^1$, rides over the spaces between the notches, $b^{10}$, similar to a pawl's movement over the tops of the notches of a ratchet.

It is evident from the foregoing description that two forward and two reverse speeds of the drill spindle may be had without shifting the belt on the cone pulleys and without reversing the drive of the machine.

What I claim as new and desire to secure by Letters Patent of the United States, is:—

1. A change speed and reversing mechanism for power driven machines embodying in combination, (1) a counter shaft, two normally loose pulleys thereon and means for engaging them at will alternately with the rotating shaft; (2) a driven shaft arranged at right angles with the counter shaft, two normally loose pulleys thereon and means for engaging them at will alternately with said driven shaft; and (3) a continuous driving belt connecting the pulleys respectively, as set forth.

2. The combination in a power driven machine of a driven shaft; two normally loose pulleys thereon; a sliding clutch adapted to engage either of said pulleys rotatively with the shaft; a counter-shaft arranged at right angles with the axial plane of the driven shaft; two normally loose pulleys thereon; a sliding clutch adapted to engage either of said last named pulleys with the counter-shaft; and a continuous driving belt connection between the four pulleys.

In testimony whereof I have hereunto set my hand in presence of two subscribing witnesses.

ARTHUR C. PLETZ.

Witnesses:
JOSEPH R. GARDNER,
CARROLL H. RICHARDS.